H. J. BROWN.
CAMERA ATTACHMENT.
APPLICATION FILED FEB. 6, 1915.
1,327,138.  Patented Jan. 6, 1920.
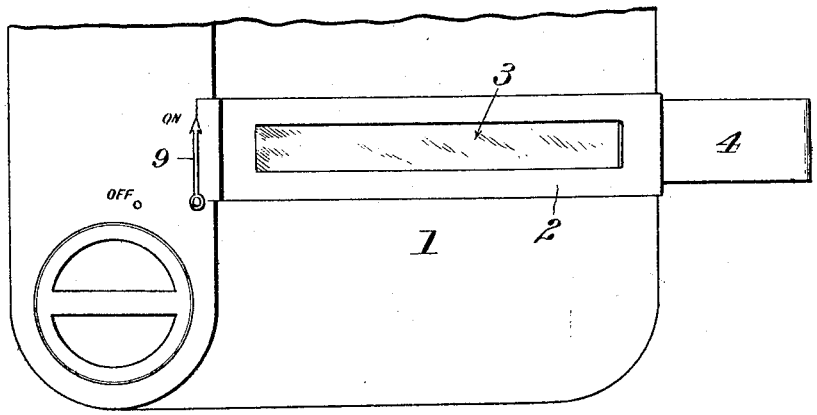
Fig. 1.
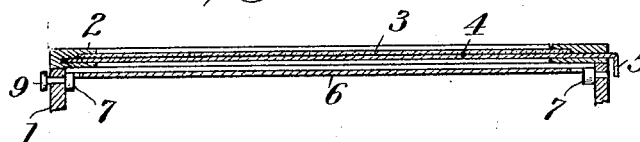
Fig. 2.
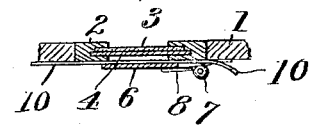
Fig. 3.
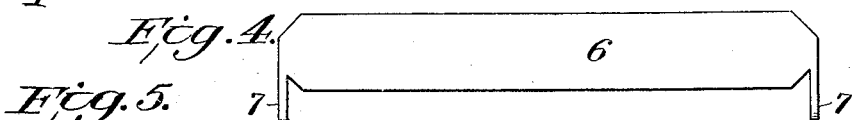
Fig. 4.
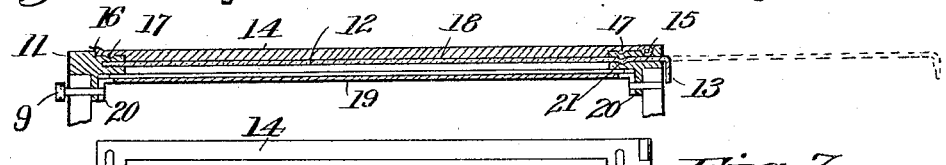
Fig. 5.
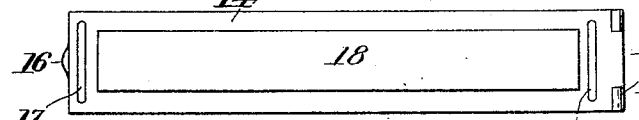
Fig. 7.
Fig. 6.
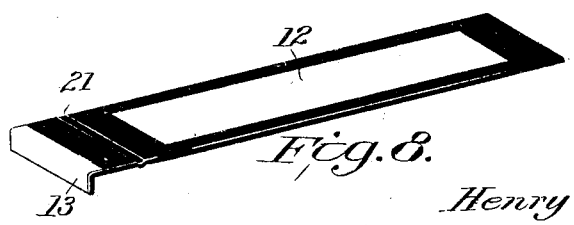
Fig. 8.
Inventor,
Henry J. Brown.
Witnesses
C. N. Walker.
E. Sterzer.
By Frederick V. Winters
Attorney

UNITED STATES PATENT OFFICE.

HENRY J. BROWN, OF NEW YORK, N. Y.

CAMERA ATTACHMENT.

1,327,138.  Specification of Letters Patent.  Patented Jan. 6, 1920.

Application filed February 6, 1915. Serial No. 6,568.

*To all whom it may concern:*

Be it known that I, HENRY J. BROWN, a subject of the King of England, residing at New York, in the county of Bronx and State of New York, have invented certain new and useful Improvements in Camera Attachments, of which the following is a full, clear, and exact specification.

This invention relates to cameras and has for its object to provide an improved attachment for marking each picture when it is taken. To this end, the invention consists of means for protecting a portion of the film from exposure during the taking of a picture, and means for using said protected or unexposed part of the film for producing a negative in either white or black lines of any desired title or other matter, so that after the film has been developed, the picture and title or other marking matter may be printed simultaneously from the single film or negative.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views:—

Figure 1 is a perspective view of one end of a camera showing one form of my invention attached thereto.

Fig. 2 is a longitudinal section through the attachment.

Fig. 3 is a transverse section through the same.

Fig. 4 is a detailed plan view of the hinged plate at the bottom of the attachment for protecting the portion of the film to be marked from the light when the main portion of said film is exposed in taking the picture.

Fig. 5 is a longitudinal section of another form of attachment.

Fig. 6 is a transverse section of the same.

Fig. 7 is an under plan view of the outer hinged cover in the second form of attachment, and Fig. 8 is a detailed perspective view of the semi-transparent slide used in the second form of the invention.

Referring first to Figs. 1 to 4 of the drawings, 1 designates a common type of camera to which one form of my marking attachment is connected. Said attachment comprises a casing 2 set into the outer wall of the camera case. In the casing there is an opening of any desired shape in which is fitted a semi-transparent plate 3 which may be of celluloid or ground glass or any other suitable material which will permit one marking or inscription to be erased and another written thereon so that it may be used over and over again.

Below the plate 3 a removable slide 4 is arranged, the same being adapted to be drawn out, as illustrated in Fig. 1 upon grasping the bent over end or handle 5, Fig. 2. The slide 4 is of opaque material so that when pushed all the way in, as shown in Fig. 2, it will exclude all light from entering the camera case. Of course, when the slide 4 is drawn out, the portion of the film below the opening covered by the plate 3 will be exposed and whatever inscription is written on said semi-transparent plate will accordingly be transferred to said exposed portion of the film.

In order to prevent the portion of the film below the semi-transparent plate from being exposed when the main portion of the film is exposed in taking the picture, I provide a plate 6 hinged at 7 below the film and normally pressed against the inner face of the casing 2 so as to shut off the opening therein in which the plate 3 is fitted, by means of springs 8, Fig. 3. The pivot at one end of the hinged plate 6 is extended through the side of the casing of the camera and carries on its outer end an indicating and operating arm or pointer 9, see Figs. 1 and 2. The film 10 is passed between the plate 6 and the inner face of the casing 2 of the attachment, as clearly illustrated in Fig. 3. When the roll of films is being moved to bring a new film into position, the plate 6 is swung inward by moving the arm 9 from the "on" to the "off" position, so as to permit the film to slide freely without the friction of the plate bearing upon it under the influence of the springs 8. When the new film has been brought into position in the usual manner, the arm 9 is moved again to the "on" position in which the springs 8 will press the plate 6 firmly against the portion of the film below the opening in the attachment in which the transparent plate is fitted, thus preventing such portion of the film from being exposed when the remainder of the film is exposed in taking the picture. As already indicated, after the picture has been taken on the main portion of the film, any suitable inscription may be written on the semi-transparent plate 3 and subsequently transferred to the smaller portion of the film which has been maintained in an unexposed condition by simply drawing out the slide 4 which is arranged between said plate 3 and said unexposed portion of the film lying above the plate 6. It is obvious that portions of the usual black paper backing, when such paper is used, may be cut away at the necessary point to permit the printing of the inscriptions from the back of the camera, as disclosed in my pending application, filed March 30, 1915. The inscription may then be erased and another one written in its place on the semi-transparent plate for the next picture.

Referring now to Figs. 5 to 8, instead of making the semi-transparent plate fixed, as in the first form of the invention, said plate may be made as a slide 12 and arranged in the casing 11 of the attachment below a cover 14 which may be hinged at one end, as at 15, Figs. 5 and 7. The free end of the hinged cover 14 may have a lip 16 to be engaged by the finger nail for raising the same. The cover may further be provided with transverse rib 17 on its under surface to engage and fit corresponding grooves in the casing 11 as a security against the admission of light. A boss 18 on the under surface of the cover 14 fits into and fills the opening in the casing 11 in which the semi-transparent slide 12 fits, for the same purpose of excluding light.

The slide 12 may have a black border as illustrated in Fig. 8, and it is equipped with a bent down end or handle 13, Fig. 5 by means of which it may be drawn out for the purpose of writing thereon the desired inscription without opening the cover 12 and thus admitting the light. Adjacent the outer end of the slide 12 a transverse concavo-convex bead 21 is formed to fit in between a correspondingly shaped bead and groove formed in the upper and lower walls of the passage in the casing 11 in which said slide is fitted. This arrangement of beads and grooves is designed to prevent the light from entering the camera while the slide 12 is being pulled out for the purpose of writing the inscription thereon. It will be understood that after the desired inscription has been written on the slide 12, the latter is slipped back again into the casing 11, and the cover 14 then raised to admit the light necessary to transfer said inscription to the portion of the film which has been protected from exposure. The same form of hinged plate 19 pivoted at 20 and having the indicating and operating handle 9, is used in this second form of the invention as in the first form. It will be understood that the form of the invention illustrated in Figs. 1 to 4 may also be provided with a cover plate of any suitable form similar, for instance, to either the hinged cover 14 or the sliding shutter 4.

Having thus described my invention, what I claim as new and desire to secure by Letters Patent of the United States is:—

1. An attachment for cameras comprising a casing having an opening therein, a hinged plate for holding a portion of a film over said opening and protecting the same from exposure when the main portion of the film is exposed in taking a picture, means for swinging said hinged plate away from the film to permit adjustment of the latter, a semi-transparent plate in said opening to receive an inscription, and displaceable means for preventing light from passing through said semi-transparent plate to the unexposed portion of the film for the purpose specified.

2. An attachment for cameras comprising a casing having an opening therein, a hinged plate for holding a portion of a film over said opening and protecting the same from exposure when a picture is taken on the main portion of said film, an indicating and operating arm on the outside of the casing for moving said hinged plate away from the film to permit adjustment of the latter, a semi-transparent plate in said opening to receive an inscription, and displaceable means for preventing light from passing through said semi-transparent plate to the unexposed portion of the film for the purpose specified.

3. An attachment for cameras comprising a casing having an opening therein, a hinged plate for holding a portion of a film over said opening and protecting the same from exposure when a picture is taken on the main portion of the film, resilient means for normally holding said hinged plate pressed against the film, means for swinging said hinged plate away from the film to permit adjustment of the latter, a semi-transparent plate in said opening to receive an inscription, and displaceable means for preventing light from passing through said semi-transparent plate to the unexposed portion of the film for the purpose specified.

In testimony whereof I have signed my name to this specification in the presence of two attesting witnesses.

HENRY J. BROWN.

Witnesses:
A. HAEGEN,
WM. M. CHRISTIE.